(12) United States Patent
Annampedu et al.

(10) Patent No.: US 7,738,200 B2
(45) Date of Patent: Jun. 15, 2010

(54) SYSTEMS AND METHODS FOR ESTIMATING TIME CORRESPONDING TO PEAK SIGNAL AMPLITUDE

(75) Inventors: Viswanath Annampedu, Schnecksville, PA (US); Keith R. Bloss, Schnecksville, PA (US); Tianyang Ding, Saratoga, CA (US); Jeffrey P. Grundvig, Loveland, CO (US); Roy S. Neville, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 1080 days.

(21) Appl. No.: 11/415,819

(22) Filed: May 1, 2006

(65) Prior Publication Data
US 2007/0253084 A1    Nov. 1, 2007

(51) Int. Cl.
G11B 5/09 (2006.01)
G11B 21/02 (2006.01)

(52) U.S. Cl. .............................. 360/39; 360/75; 360/51
(58) Field of Classification Search ........................ None
See application file for complete search history.

(56) References Cited

U.S. PATENT DOCUMENTS

| | | | |
|---|---|---|---|
| 5,668,679 A * | 9/1997 | Swearingen et al. .......... 360/75 |
| 7,002,761 B1 * | 2/2006 | Sutardja et al. ............... 360/29 |
| 7,154,689 B1 * | 12/2006 | Shepherd et al. ............. 360/48 |
| 7,230,789 B1 * | 6/2007 | Brunnett et al. ............... 360/75 |
| 7,301,717 B1 * | 11/2007 | Lee et al. ....................... 360/51 |
| 7,375,918 B1 * | 5/2008 | Shepherd et al. ......... 360/78.14 |
| 2003/0095350 A1 | 5/2003 | Annampedu |
| 2007/0263311 A1 * | 11/2007 | Smith .......................... 360/48 |

OTHER PUBLICATIONS

Viswanath Annampedu and Pervez M. Aziz, "Adaptive Algorithms for Asynchronous Detection of Coded Servo Signals Based on Interpolation," IEEE Transactions on Magnetics. vol. 41, No. 10, Oct. 2005.

* cited by examiner

Primary Examiner—Andrew L Sniezek
(74) Attorney, Agent, or Firm—Hamilton, DeSanctis & Cha

(57) ABSTRACT

Various systems and methods for peak signal detection. As one example, a method for peak signal detection that includes receiving a signal is disclosed. The received signal includes a signal region where the signal is increasing in amplitude, another signal region where the signal is decreasing in amplitude, and a transitional signal region coupling the first two signal regions. In some cases, the transitional region is of zero duration and the signal transitions directly from the increasing region to the decreasing region. The method further include calculating a distance between the signal region of increasing amplitude and the signal region of decreasing amplitude, and determining a peak of the received signal that is one half the distance from the signal region of increasing amplitude.

10 Claims, 11 Drawing Sheets

SYSTEMS AND METHODS FOR ESTIMATING TIME CORRESPONDING TO PEAK SIGNAL AMPLITUDE

BACKGROUND OF THE INVENTION

The present invention is related to storage media. More particularly, the present invention is related to systems and methods for preparing servo data on a storage medium.

A typical digital magnetic storage medium includes a number of storage locations where digital data may be stored. Data is written to the medium by positioning a read/write head assembly over the medium at a selected location, and subsequently passing a modulated electric current through the head assembly such that a corresponding magnetic flux pattern is induced in the storage medium. To retrieve the stored data, the head assembly is positioned anew over the track. In this position, the previously stored magnetic flux pattern induces a current in the head assembly that can be converted to the previously recorded digital data.

The storage locations on the magnetic storage medium are typically arranged as a serial pattern along concentric circles known as tracks. FIG. 1 shows a storage medium 100 with two exemplary tracks 150, 155 as dashed lines. The tracks are segregated by servo data written within wedges 160, 165. These wedges include data and supporting bit patterns that are used for control and synchronization of the head assembly over a desired storage location on storage medium 100. The data and supporting bit patterns used to derive the control and synchronization is depicted as a pattern 110 that includes a preamble 152, a sync 154, a gray code 156 and a burst 158. It should be noted that while two tracks and two wedges are shown, hundreds of each would typically be included on a given storage medium.

Traditionally, the servo data within wedges 160, 165 has been written by an external servo writer which is costly both in terms of equipment and time. In some cases, disk drive manufacturers have utilized the read/write head assembly to write the servo data using a process known as self servo writing. As one example of this process, an external writer is used to write servo data for only a limited number a tracks at an outer edge 190 of storage medium 100. Using this as a guide, the head assembly can then be used to write the servo data corresponding to the inner tracks. As another example, a reference pattern is applied more generally to storage medium 100 in a known way, but not corresponding directly to wedges 160, 165. While both approaches offer viable alternatives to the traditional approach, each requires additional capability for positioning the head assembly.

Hence, for at least the aforementioned reasons, there exists a need in the art for advanced systems and methods for head assembly positioning during self servo writing.

BRIEF SUMMARY OF THE INVENTION

The present invention is related to storage media. More particularly, the present invention is related to systems and methods for preparing servo data on a storage medium.

Some embodiments of the present invention provide methods for peak signal detection. The methods include receiving a signal. The received signal includes a signal region where the signal is increasing in amplitude, another signal region where the signal is decreasing in amplitude, and a transitional signal region coupling the first two signal regions. In some cases, the transitional region is of zero duration and the signal transitions directly from the increasing region to the decreasing region. The methods further include calculating a distance between the signal region of increasing amplitude and the signal region of decreasing amplitude, and determining a peak of the received signal that is one half the distance between the two signal regions.

In some instances of the aforementioned embodiments, the signal region of decreasing amplitude is substantially symmetric with the signal region of increasing amplitude. In such instances, calculating the distance between the two signal regions may include determining a slope of the increasing amplitude and the slope of the decreasing amplitude, and determining an intercept between the slope of the increasing amplitude and the slope of the decreasing amplitude.

In other cases, calculating the distance between the two signal regions may include storing a plurality of sequential samples received from the region of increasing amplitude, and another plurality of sequential samples received from the region of decreasing amplitude. The plurality of samples from the two regions are compared on a sample by sample basis in reverse order. The plurality of samples from the region of decreasing amplitude is repeatedly updated with additional samples that are compared with those from the region of increasing amplitude at least until a minimum difference between the sample sets is identified. In particular cases, a first time is associated with the sample set from the increasing amplitude region and a second time is associated with the sample set from the decreasing amplitude region. From these, a time to the peak or center of the signal is determined. In some cases, digital interpolation is applied to the signal to create the sets of sequential samples. In other cases, a time recovery loop is applied such that a sample clock used to retrieve the samples from the signal is synchronized with the peaks of information maintained in the signal.

In some instances of the aforementioned embodiments, the methods further include providing a storage medium that includes a spiral reference pattern thereon. In such instances, receiving the signal includes traversing the storage medium along a traversal path that crosses the spiral reference pattern at an angle greater than zero. In such instances, the region of increasing amplitude occurs in relation to an increasing crossover with the spiral reference pattern and the region of decreasing amplitude occurs in relation to a decreasing crossover with spiral reference pattern. The transitional signal region occurs in relation to a substantially constant cross-over with the spiral reference pattern. In some cases, the angle at which the traversal path crosses the spiral reference pattern is programmable through the power of placing the spiral reference pattern on the storage medium.

Other embodiments of the present invention provide systems for writing servo data. Such systems include a spiral entry locator circuit that is operable to detect an entry crossover of a spiral reference pattern, and a spiral exit locator circuit that is operable to continuously detect an exit crossover of the spiral reference pattern. In addition, the systems include a comparator that is operable to determine a minimum difference between an output of the spiral exit locator circuit and an output of the spiral entry locator circuit. A location calculator is included that is operable to determine a location corresponding to a peak of the spiral reference pattern.

In some instances of the aforementioned embodiments, a storage medium is provided that includes a spiral reference pattern. In such instances, the spiral entry locator circuit receives a signal from a head assembly traversing the storage medium along a traversal path that crosses the spiral reference pattern at a non-zero angle. As the head begins traversing the spiral reference pattern the spiral entry locator circuit identifies a region of increasing signal amplitude. Further, as the head traverses the path away from the spiral reference pattern, the spiral exit locator circuit identifies a region of decreasing signal amplitude.

In one particular instance of the aforementioned embodiments, the spiral entry locator circuit includes a programmable sample number. In such an instance, the spiral entry locator circuit is further operable to store a sequence of samples corresponding to the programmable sample number from an entry region of the spiral reference pattern. In some cases, the spiral entry locator circuit is further operable to store another sequence of samples corresponding to the programmable sample number from an exit region of the spiral reference pattern.

Yet other embodiments of the present invention provide methods for identifying servo data locations on a storage medium. The methods include providing a storage medium that includes a spiral reference pattern, and traversing the storage medium along a traversal path. The traversal path crosses the spiral reference pattern at a non-zero angle and results in receiving a signal. The received signal includes a region of increasing amplitude, a region of decreasing amplitude and a transitional region there between. In some cases, the transitional region is of zero duration and the signal transitions directly from the increasing region to the decreasing region. The methods further include identifying a location in the region of increasing amplitude and a corresponding location in the region of decreasing amplitude. A time is fixed for the location in the region of increasing amplitude and another time is fixed for the location in the region of decreasing amplitude. Based at least in part on the fixed times, a distance between the locations is calculated, and a peak of the signal is determined.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to storage media. More particularly, the present invention is related to systems and methods for preparing servo data on a storage medium.

Figure 1:
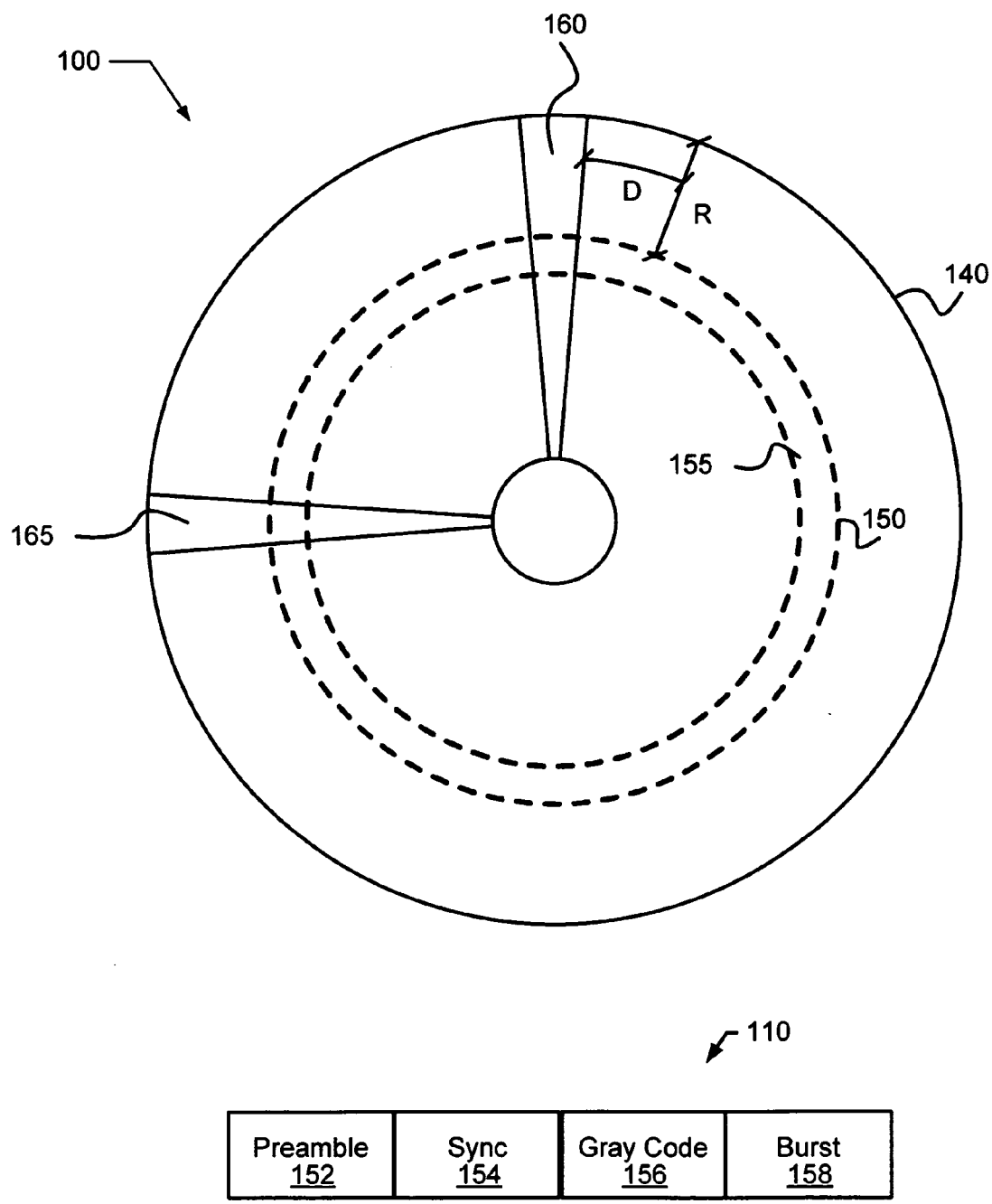
FIG. 1 depicts a known storage medium.
Figure 2A:
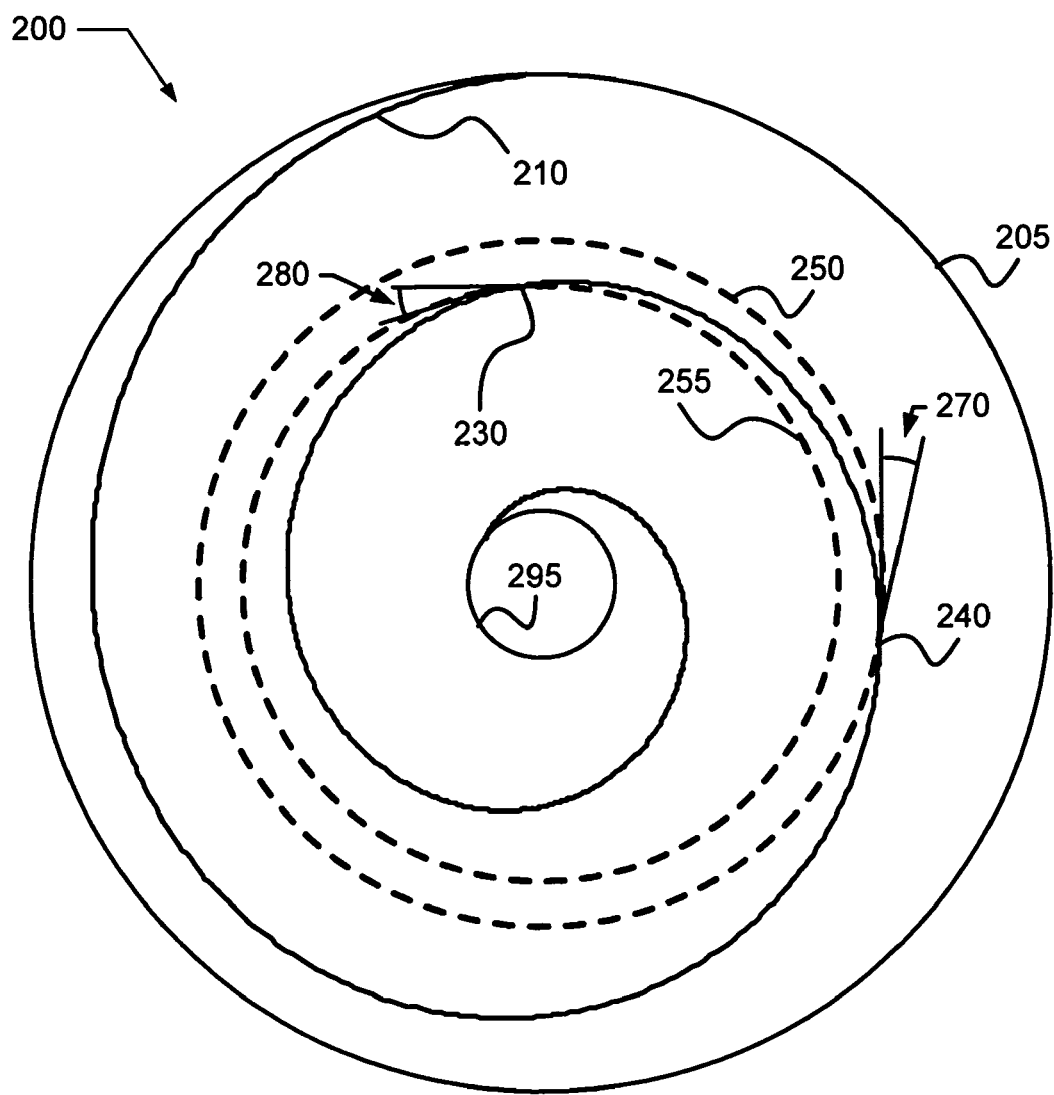
FIGS. 2a-2c graphically depict a method for writing servo data using a spiral reference pattern in accordance with one or more embodiments of the present invention.

Turning to FIG. 2a, a storage medium 200 is depicted with a spiral reference pattern 210 formed thereon. In one particular case, the spiral reference pattern includes a repeating pattern of a preamble and servo address mark. In addition, two tracks 250, 255 are also shown on storage medium 200 as dashed lines. Tracks 250, 255 may be formed as concentric circles on storage medium 200 at known distances from an outer edge 205 of storage medium 200. The data stored on storage medium 200 may be serially arranged along tracks 250, 255. It should be noted that a much larger number of tracks may be used in accordance with embodiments of the present invention and that the depiction of only two tracks is intended to simplify the description.

As shown, spiral reference pattern 210 extends in a smooth spiral shape from an outer edge 205 of storage medium 200 to an inner edge 295 of storage medium 200. In some cases, spiral reference pattern 210 is formed when the head of an external servo writer writes a repeating pattern as storage medium 200 is rotated at a constant rate and the head of the external servo writer is moved from outside edge 205 to inner edge 295 also at a constant rate. Using such an approach, any circumferential location along spiral reference pattern 210 is a function of distance from outer edge 205. Based on the disclosure provided herein, one of ordinary skill in the art will recognize other approaches that may be utilized for forming spiral reference pattern 210.

Track 250 intersects spiral reference pattern at a location 240, and an angle 270. Track 255 intersects spiral reference pattern 210 at a location 230, and an angle 280. The angle at which a track intersects spiral reference pattern 210 is a function of the number of revolutions included in spiral reference pattern from outer edge 205 to inner edge 295 and in some cases can be programmed at the time spiral reference pattern 210 is written on storage medium 200. As shown, spiral reference pattern 210 makes approximately two revolutions around storage medium 200 resulting in relatively large angles 270, 280. However, spiral reference pattern 210 is merely exemplary and it should be noted that spiral reference pattern 210 may make many more revolutions as it progresses from outer edge 205 to inner edge. This increase in revolutions results in a corresponding decrease in angles 270, 280. In some embodiments, the number of revolutions is high and the corresponding intersection angles are close to zero, but still non-zero.

Figure 2B:
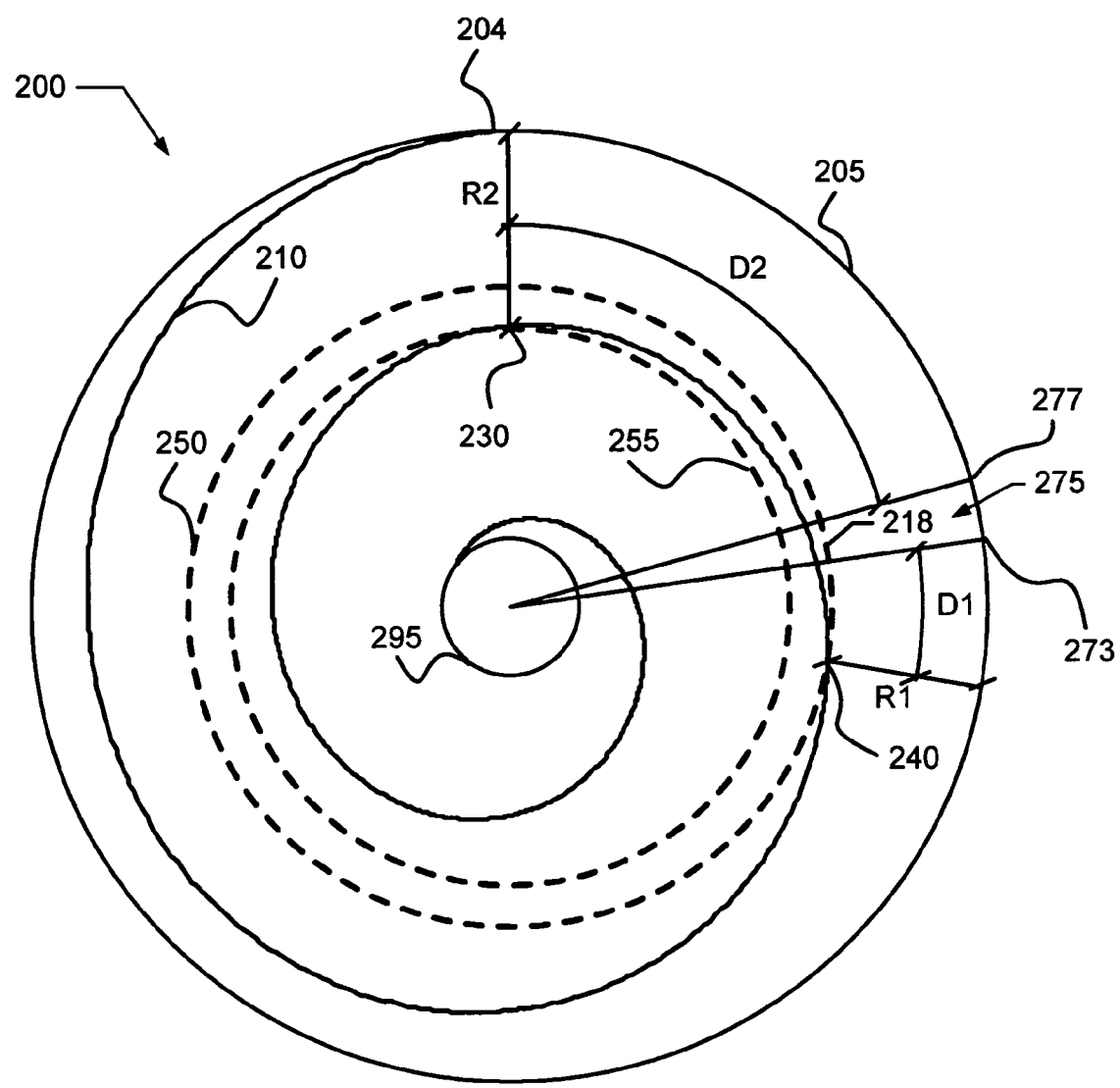

Turning to FIG. 2b, an exemplary wedge 275 extending from an edge 273 to another edge 277 is included as part of storage medium 200. Wedge 275 can be one of many wedges distributed like spokes of a wheel across the circumference of storage medium 200. Wedge 275 may be written with a standard servo data pattern including a preamble, a sync, a gray code and a burst. In accordance with some embodiments of the present invention, this servo data pattern may be written at locations along particular tracks using spiral reference pattern 210 as a location guide. In particular, a location for servo data within wedge 275 may be defined as a distance, D1, from intersection point 240, or a distance, D2, from intersection point 230. In some cases, D1 and D2 are measured as times where storage medium 200 is rotated at a known rate.

In an exemplary operation, storage medium 200 is provided with spiral reference pattern 210 formed thereon. Storage medium 200 is installed in a disk drive that includes a read/write head assembly disposed near the surface of storage medium 200. Storage medium 200 is rotated in relation to the head assembly. As storage medium 200 rotates, the head assembly traverses along a traversal path that intersects spiral reference pattern 210 at particular intersection locations depending upon the distance of head assembly from outer edge 205. By detecting the intersection location, the distance of the head assembly from outer edge 205 can be determined, along with a circumferential location relative to a starting point 204 of spiral reference pattern 210. Based on this information, the location of the head assembly can be adjusted in relation to outer edge 205 such that it is disposed over a selected one of tracks 250, 255. In addition, storage medium 200 can be rotated such that the head assembly is located at one of the edges 273, 277 of wedge 275. Thus, for example, where servo data is to be written as part of track 255 at wedge 275, the head assembly can be positioned at edge 273 where it intersects track 255. From this location, storage medium 200 is rotated at a known rate such that the head assembly traverses a portion 218 of track 255. As the head assembly traverses portion 218, a modulating electric current is passed through the head assembly causing the servo data to be written along portion 218. This process is repeated for the other wedges (not shown) that are distributed on the surface of storage medium 200, and for other tracks also distributed on the surface of storage medium 200.

To write the servo data properly, it is desirable to accurately detect the intersection with spiral reference pattern 210 such that the head assembly may be properly positioned within the wedge to be written. In some embodiments of the present invention, the location of the intersection is defined as approximately the median amount of time that the head assembly is in a position to detect the spiral reference pattern as storage medium 200 is rotated.

Figure 2C:
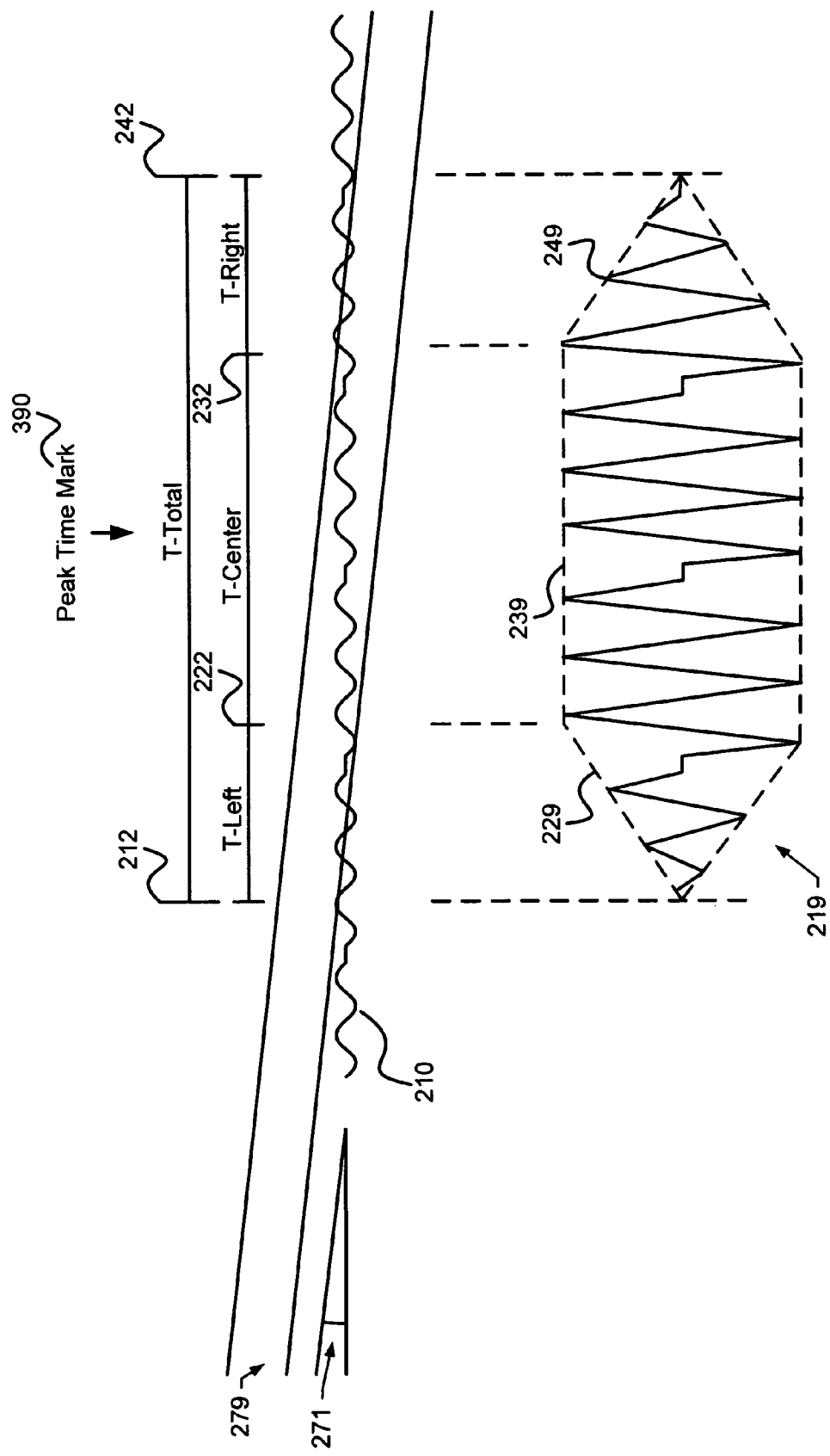

This process of detecting the intersection with spiral reference pattern 210 is further described in relation to FIG. 2c. A traversal path 279 indicates the path traversed from right to left by the head assembly as storage medium 200 is rotated in relation thereto. As shown by traversal path 279, the head assembly begins to intersect spiral reference pattern 210 at an angle 271, and a location/time 212. At this point, the head assembly moving along traversal path 279 begins detecting spiral reference pattern 210, but the detected signal amplitude is relatively small due to the limited cross over between the head assembly and the spiral reference pattern. As the head assembly continues, the cross over with spiral reference path 210 increases and causes a corresponding increase in the detected signal amplitude. This increase in detected signal amplitude is graphically depicted as a region 229 of increasing amplitude of an overall detected signal pattern 219. The detected signal amplitude continues to increase until a location/time 222 where the head assembly is entirely over spiral reference path 210. A transitional region 239 is traversed where the detected signal amplitude remains substantially constant. This continues until a location/time 232 where the head assembly begins to move away from spiral reference path 210. As the head assembly moves away from spiral reference path 210, the amplitude of the detected signal begins to decrease. This results in a region 249 of decreasing signal amplitude. Such a traversal of spiral reference pattern 210 along traversal path 279 results in a symmetry of overall detected signal pattern 219.

As will be appreciated by one of ordinary skill in the art based on the disclosure provided herein, the shape of overall detected signal pattern 219 may be changed where one or more variables are modified. The depicted "submarine" shape may assume more of "football shape" or more of a "diamond" shape or "elongated diamond" shape as one or more variables is/are modified. For example, where intersection angle 271 is increased, the length of time that the head spends traversing spiral reference pattern 210 is decreased causing the rate of the increase in amplitude at region 229 and the rate of decrease in amplitude at region 249 to accelerate. In addition, the length of transitional region 239 is decreased. In some cases, the length of transitional region 239 is reduced to zero. In such cases, transitional region 239 is an immediate transition of zero length from an area of increasing amplitude to an area of decreasing amplitude. As another example, where the area that is detectable by the head assembly is narrowed (i.e., traversal path 279 is narrower), the length of overall detected signal pattern 219 is decreased. Further, it should be noted that overall detected signal pattern 219 is shown with exemplary repetition of the signal written as part of spiral reference pattern 210, but that many more repetitions are common within region 229 and region 249. Thus, where approximately two peaks are shown in each of regions 229, 249, an actual detected signal may include ten or more peaks within each region.

Traversal of spiral reference pattern 210 by the head assembly is accomplished in a period T-Total which is affected by the rate at which storage medium 200 is rotated in relation to the head assembly. Period T-Total includes a period T-Left consumed in traversing region 229, a period T-Center consumed in traversing transitional region 239, and a period T-right consumed in traversing region 249. In particular embodiments of the present invention, the half way point of period T-total is calculated. This mid-way point is referred to as peak time mark 390 and may be used as the intersection point for determining locations within wedges to be written with servo data. Such an approach offers increased accuracy when compared with simply detecting any intersection with spiral reference path 210. In addition, the accuracy is not lost where angle 271 is increased or decreased, or where the width of traversal path 279 is modified.

In some embodiments of the present invention, determining peak time mark 390 includes identifying a signal portion associated with region 249 that exhibits a similar amplitude as known portion of region 229, and calculating the mid-point between the respective signal portions. This may be represented in time by added a time associated with the portion of region 229 to the time associated with the portion of region 249, and dividing in half. This approximate mid-point serves as an accurate representation of the location of spiral reference pattern 210, and can be used for identifying appropriate locations for writing the various wedges.

Figure 3:
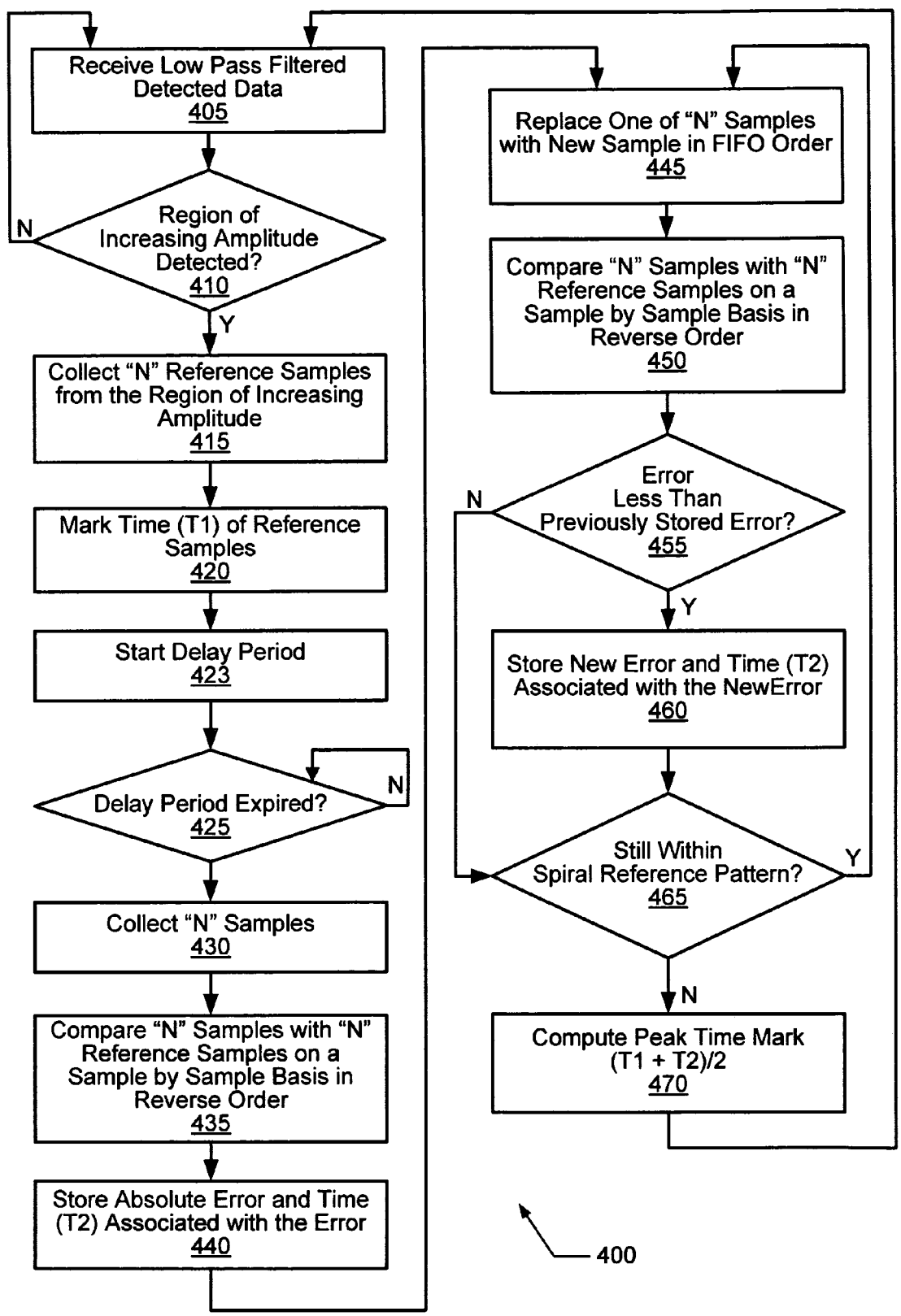
FIG. 3 is a flow diagram showing a method for writing servo data in accordance with some embodiments of the present invention.

Turning to FIG. 3, a flow diagram 400 illustrates a method in accordance with one or more embodiments of the present invention for identifying peak time mark 390 as discussed above. Following flow diagram 400, a low pass filtered signal is received (block 405). The system continues to receive low pass filtered signals until the distinctive increase in amplitude corresponding to region 229 is detected (block 410). Once it is determined that the detected signal is within region 229 (block 410), a programmable number (i.e., "N") of consecutive samples of the detected signal are captured (block 415), and a time associated with the detected samples is stored (block 420). The samples from region 229 are generally referred to as reference samples.

With the reference samples of region 229 captured (block 415), a delay period is started (block 423) and the period of the delay is waited (block 425) to avoid comparison of the reference samples from region 229 with later samples that may result in a false indication that an appropriate point in region 249 has been achieved. Once the delay period has expired (block 425), another set of "N" consecutive samples is captured (block 430) and compared with the previously captured reference samples (block 435). This comparison is done on a on a sample by sample basis and in reverse order. The reverse order of the comparison accounts for the fact that the reference samples are captured in region 229 where the amplitude is increasing, and the purpose of the comparison is to identify a reasonably close set of samples from region 249 where the amplitude is decreasing. The sum of absolute errors from the comparison is stored for the comparison along with a time corresponding to the samples (block 440).

In the next sample period, one or the recently captured "N" samples is replaced with a new sample in FIFO order (block 445). This newly constituted set of samples is compared with the reference samples using the same approach as described in block 435 (block 450). Where the newly computed comparison error is less than the previously stored comparison error (block 455), the newly computed comparison error replaces the previous comparison error and a time stamp associated with the newly computed comparison error is stored as time T2 (block 460). Alternatively, where the newly computed comparison error is greater than the previously stored comparison error (block 455), the previously stored comparison error is retained.

It is determined whether the head assembly is still traversing spiral reference pattern 210 (block 465). Where the head assembly is still traversing spiral reference pattern 210 (block 465), the next detected signal is received and the process of blocks 445-465 is repeated. Alternatively, where the head assembly has moved beyond spiral reference path 210 (block 465), peak time mark 390 is computed by averaging times T1 and T2. This approximate mid-point serves as an accurate representation of the location of spiral reference pattern 210, and can be used for identifying appropriate locations for writing the various wedges. At this point, the process returns to the beginning to await the next intersection with spiral reference pattern 210.

Turning to FIGS. 4, a system 300 for detecting an approximate mid-point of the traversal region is discussed. As shown, system 300 includes a notch filter circuit 310, a bandpass filter circuit 320, a spiral entry detector circuit 330, a phase synchronization circuit 340, a spiral exit locator circuit 350, a comparator circuit 360, and a location calculation circuit 370. In operation, a detected signal 380 is received from a read/write head assembly reading storage medium 200 along traversal path 279. Detected signal 380 is passed through both bandpass filter circuit 320 and notch filter circuit 310. Notch filter circuit 310 is operable to isolate energy at frequencies other than the frequency exhibited by spiral reference pattern 210. In contrast, bandpass filter circuit 320 is operable to isolate energy at the frequency exhibited by spiral reference pattern 210.

In some embodiments of the present invention, notch filter circuit 310 is a digital filter that has a null at the frequency of the information recorded as part of spiral reference pattern 210, and uses the following digital frequency coefficients: 1, 0, 0, 0, −1. In various embodiments of the present invention, bandpass filter circuit 320 is a digital filter that uses the following digital frequency coefficients: 1, 1, −1, −1, 1, 1, −1, −1. Based on the disclosure provided herein, one of ordinary skill in the art will recognize other filter coefficients and/or filter types that may be used in accordance with one or more embodiments of the present invention. For example, bandpass filter circuit 320 may be a longer filter than that represented by the aforementioned coefficients.

The respective outputs from bandpass filter circuit 320 and notch filter circuit 310 are provided to spiral entry locator circuit 330. In turn, spiral entry locator circuit 330 compares the received filter outputs, and time averages the comparison to determine whether detected signal 380 is within region 229 where the detected signal amplitude is increasing. Said another way, spiral entry locator circuit 330 determines if the head assembly is beginning to traverse spiral reference pattern 210 as indicated by an increase in energy at or near the frequency of data recorded in spiral reference pattern 210.

Once region 229 has been identified, spiral entry detector circuit 330 stores two or more samples separated by a determined time. Storing the samples can include flushing the latency of bandpass filter circuit 320 before to access the appropriate sample value from the filter output. These samples serve as reference samples corresponding to region 229 of overall detected signal pattern 219. The number of samples and the sampling period may be user programmable to accommodate different rates of increase and decrease of amplitude in region 229 and region 249 respectively, and different lengths of overall signal pattern 219.

To increase the accuracy of the samples and thereby the accuracy of system 300, phase synchronization circuit 330 adjusts the phase of either the sample clock or the data such that the samples correspond to the peaks of the data read from spiral reference pattern 210. This may be done asynchronously through use of a digital interpolator to interpolate detected signal 380 as received from an analog to digital converter as is known in the art. The digital interpolator produces digital samples of detected signal 380 as filtered with a phase that corresponds to, for example, the positive peak value of the data retrieved from spiral reference pattern 210. Examples of digital interpolators that may be used in accordance with embodiments of the present invention are disclosed in V. Annampedu et al., "Adaptive Algorithms for Asynchronous Detection of Coded Servo Signal Based on Interpolation," IEEE Trans. Magnetics, 2005. However, based on the disclosure provided herein, one of ordinary skill in the art will recognize a variety of digital interpolators and/or digital interpolation techniques that may be used in relation to embodiments of the present invention.

Alternatively, phase synchronization circuit 340 may implement a traditional timing recovery approach for synchronization. As an example, phase synchronization circuit 340 may be a phase lock loop circuit capable of driving a clock used to sample detected signal 380 as filtered such that the signal is captured at, for example, its positive peak value for the data retrieved from spiral reference pattern 210.

In one particular embodiment of the present invention, three samples separated by a programmable time period are stored. Based on the disclosure provided herein, one of ordinary skill in the art will recognize an appropriate number of samples to store, as well as an appropriate sample period. Further, one of ordinary skill in the art will appreciate an appropriate method for assuring that the phase at which the samples are captured is consistent across the samples, thereby yielding samples that are comparable on a sample by sample basis.

In some cases, the detected input is magnitude qualified before the first of the samples is recorded. This assures that only samples a sufficient distance away from the zero energy point of region 229 that are less susceptible to noise are stored. Once the samples are stored, a time is associated with the stored samples. This may be done, for example, by taking the time that the second of three samples was recorded as the time for all three samples. Based on the disclosure provided herein, one of ordinary skill in the art will recognize a variety of other methods that may be used to time mark the samples. For example, time may be established as zero where the first sample is stored.

Next, the time mark associated with the reference samples is provided to location calculator 370, the samples are provided to comparator 360, and processing turns to detecting the exit of traversal path 279 from spiral reference pattern 210 by spiral exit locator circuit 350. In some embodiments, spiral exit locator circuit 350 implements a delay that may be less than the time that the head is expected to be entirely over spiral reference pattern 210 (i.e., T-Center from FIG. 2c). This delay reduces the possibility that samples may be captured by spiral exit locator circuit 350 that are very near those previously captured by spiral entry locator circuit 330. Samples of such close proximity may possibly cause a false reading of region 249 by spiral exit locator circuit 350. In some embodiments, the delay time is programmable.

Once this delay has expired, spiral exit locator circuit 350 begins collecting samples of detected signal 380 as filtered. These collected samples are provided to comparator circuit 360 where they are compared with the samples previously captured by spiral entry locator circuit 330 on a on a sample by sample basis and in reverse order. Thus, for example, where three samples ($S_{IN1}$, $S_{IN2}$, $S_{IN3}$) are captured by spiral entry locator circuit 330, at least three samples ($S_{OUT1}$, $S_{OUT2}$, $S_{IN3}$) are collected by spiral exit locator circuit 350. Comparing the samples in reverse order on a sample by sample basis includes comparing $S_{IN1}$ to $S_{OUT3}$, $S_{IN2}$ to $S_{OUT2}$, and $S_{IN3}$ to $S_{OUT1}$. The reverse order of the comparison accounts for the fact that the samples captured by spiral entry locator circuit 330 are obtained in region 229 where signal amplitude is increasing, and when properly matched the samples captured by spiral exit locator circuit 350 are obtained in region 249 where signal amplitude is decreasing.

The results of each of the comparisons is used to compute a sum of absolute errors, and a time mark is associated with the calculated sum. This process of sampling and comparison is repeated until the approximate end of region 249 is identified. In particular, after a defined period, spiral exit locator circuit 350 shifts the previously captured samples one sample space right, and captures the newest sample. Thus, for example, where $S_{OUT1}$, $S_{OUT2}$, $S_{OUT3}$ represent the previously captured samples, spiral exit locator circuit 350 updates the samples to be $S_{OUTNEW}$, $S_{OUT1}$, $S_{OUT2}$. These three samples are compared with the samples previously captured by spiral entry circuit 330, a sum of absolute errors is calculated, and a time stamp associated therewith. In some embodiments of the present invention, only the time associated with the minimum absolute sum of errors is maintained. Thus, where the newly captured sample set has an absolute sum of errors that is lower than the previous sample set, the time associated with the newly captured sample set replaces the previously recorded time. Alternatively, where the newly captured sample set has an absolute sum of errors that is greater than or equal to that of the previous sample set, the time associated with the previously captured sample set is retained.

Once sampling of overall detected signal pattern 219 is completed, location calculator 370 receives the time associated with the sample set provided by spiral entry locator circuit 330 (hereinafter "T1") and the time associated with the minimum absolute sum of errors provided by spiral exit locator circuit 350 (hereinafter "T2"). Location calculator 370 provides a peak time mark that is calculated as the average of the aforementioned two times less an implementation delay as set forth in the following equation:

Peak Time Mark=$(T1+T2)/2$-Implementation Delay.

The implementation delay accounts for the delay through bandpass filter circuit 320. In addition, where phase synchronization circuit 340 includes digital interpolators, the implementation delay is augmented to account for the time delay caused by the digital interpolators.

In some cases, automatic gain control for learning and adjusting the amplitude level of detected signal 380 is accomplished using bandpass filter circuit 320. In particular, for each servo gate, servo block may report the peak or maximum value at the output of bandpass filter circuit 320 where region 249 becomes zero as the head assembly moves away from spiral reference pattern 210. Depending upon the peak value detected, a user may change a gain value maintained in the register of the read channel to modify amplification/attenuation of detected signal 380. This may be done in place of traditional adaptive solutions based on least mean squared error approaches that may not work due to the ramping up and down behavior of detected signal 380.

Figure 4A:
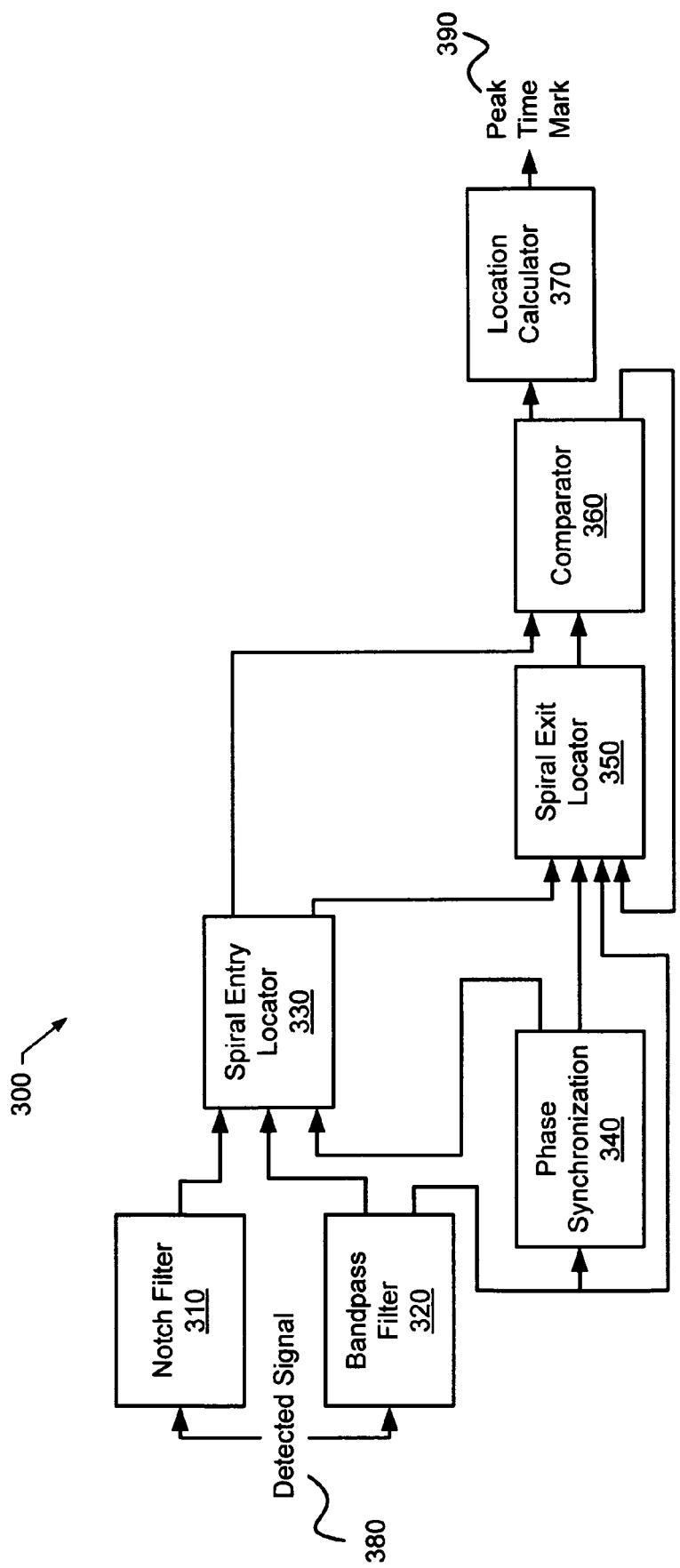
FIGS. 4a-4e show a system for writing servo data using a spiral reference pattern in accordance with various embodiments of the present invention.
Figure 4B:
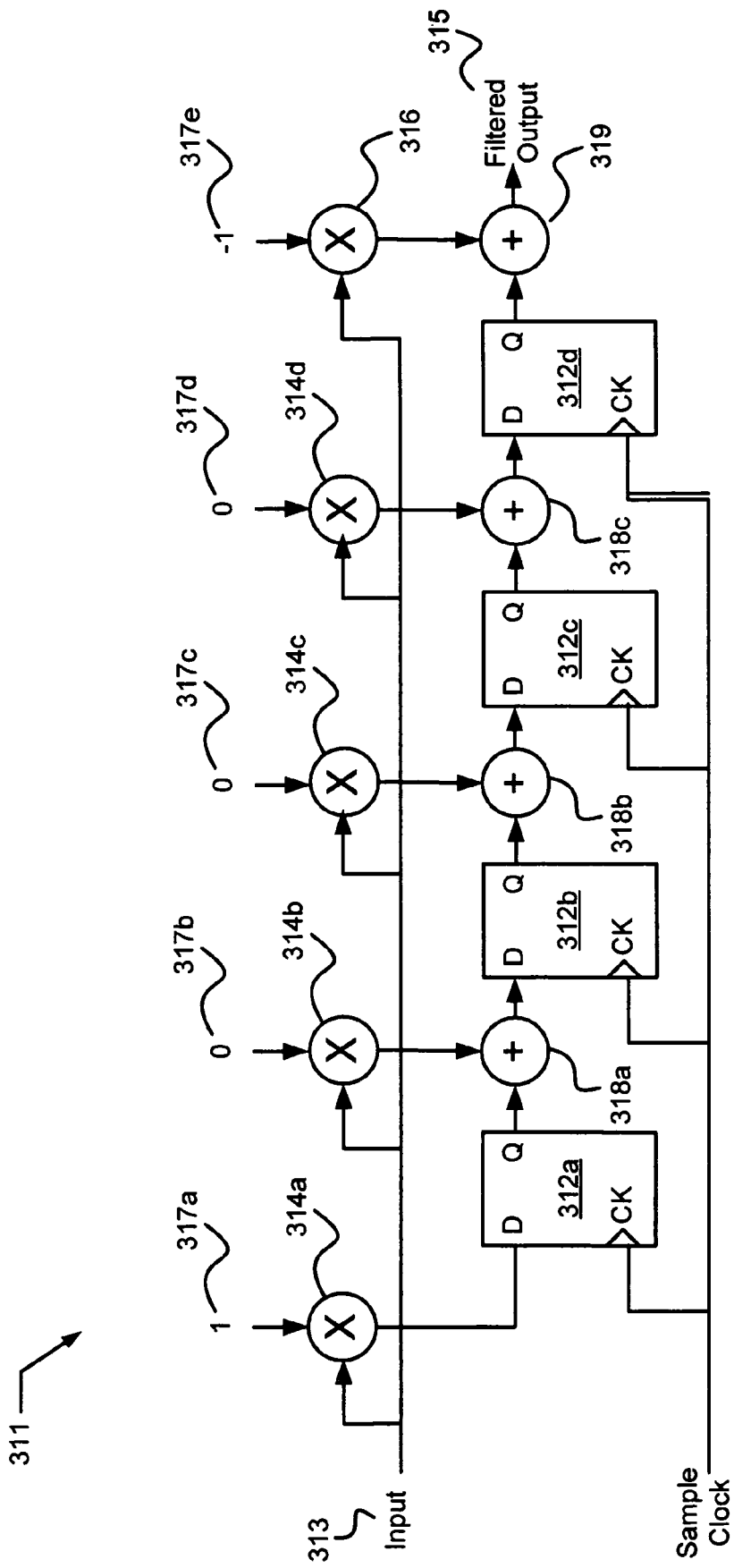

Turning to FIG. 4b, an exemplary filter 311 that may be used in place of notch filter 310 is depicted in accordance with one or more embodiments of the present invention. Filter 311 includes a series of four flip-flops 312. The input of each of flip-flops 312 is fed by an input signal 313 that is multiplied by a respective coefficient 317 in a multiplier 314, and added to the output of the preceding flip-flop using a respective adder 318. The final flip-flop in filter 311 (i.e., flip-flop 312d) feeds an adder 319 that adds the output of flip-flop 312d to input 313 as multiplied by coefficient 317e in a multiplier 316 to create a filtered output 315. When included in system 300, filtered output 315 is provided to spiral entry locator circuit 330, and input 313 is connected to detected signal 380.

Figure 4C:
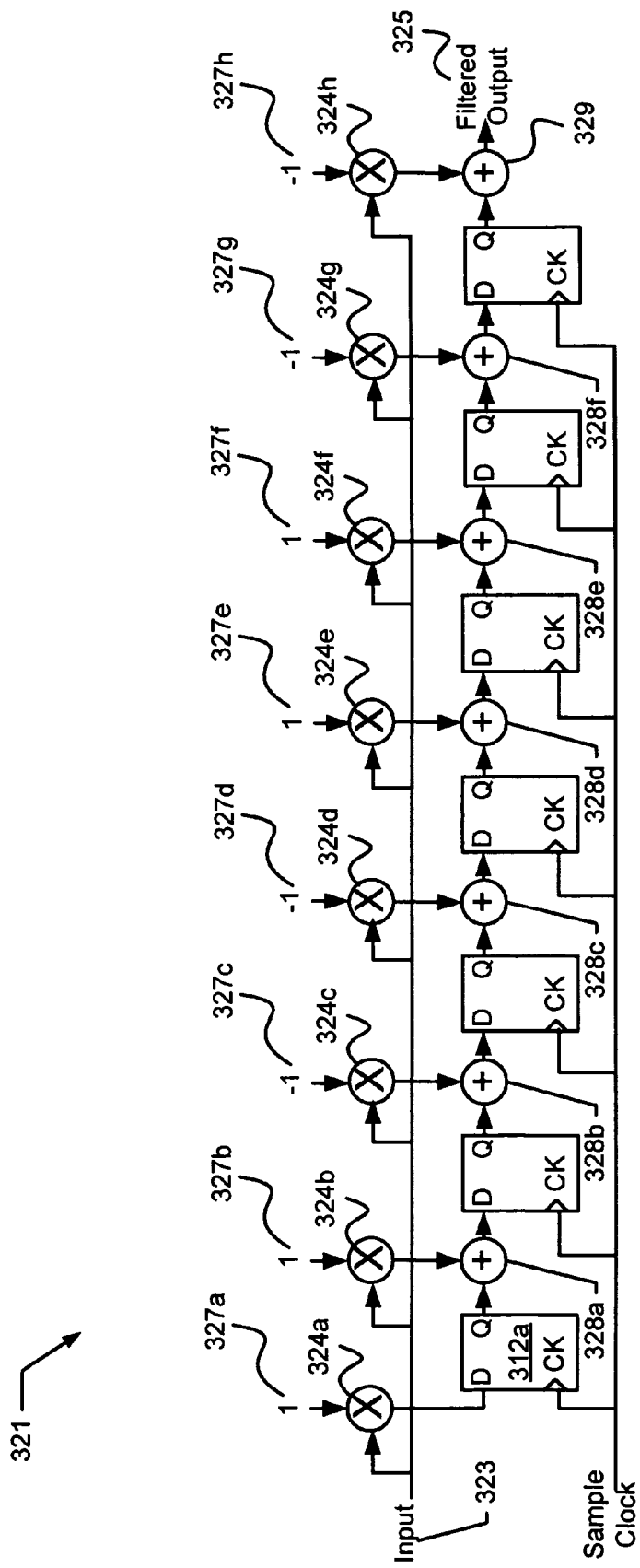

Turning to FIG. 4c, an exemplary filter 321 that may be used in place of bandpass filter 320 is depicted in accordance with one or more embodiments of the present invention. Filter 321 includes a series of seven flip-flops 322. The input of each of flip-flops 322 is fed by an input signal 323 that is multiplied by a respective coefficient 327 in a multiplier 324, and added to the output of the preceding flip-flop using a respective adder 328. The final flip-flop in filter 321 (i.e., flip-flop 322g) feeds an adder 329 that adds the output of flip-flop 312g to input 323 as multiplied by coefficient 317h in a multiplier 326 to create a filtered output 325. When included in system 300, filtered output 325 is provided to spiral entry locator circuit 330, spiral exit locator circuit 350, and phase synchronization circuit 340. In addition, input 323 is connected to detected signal 380.

Figure 4D:
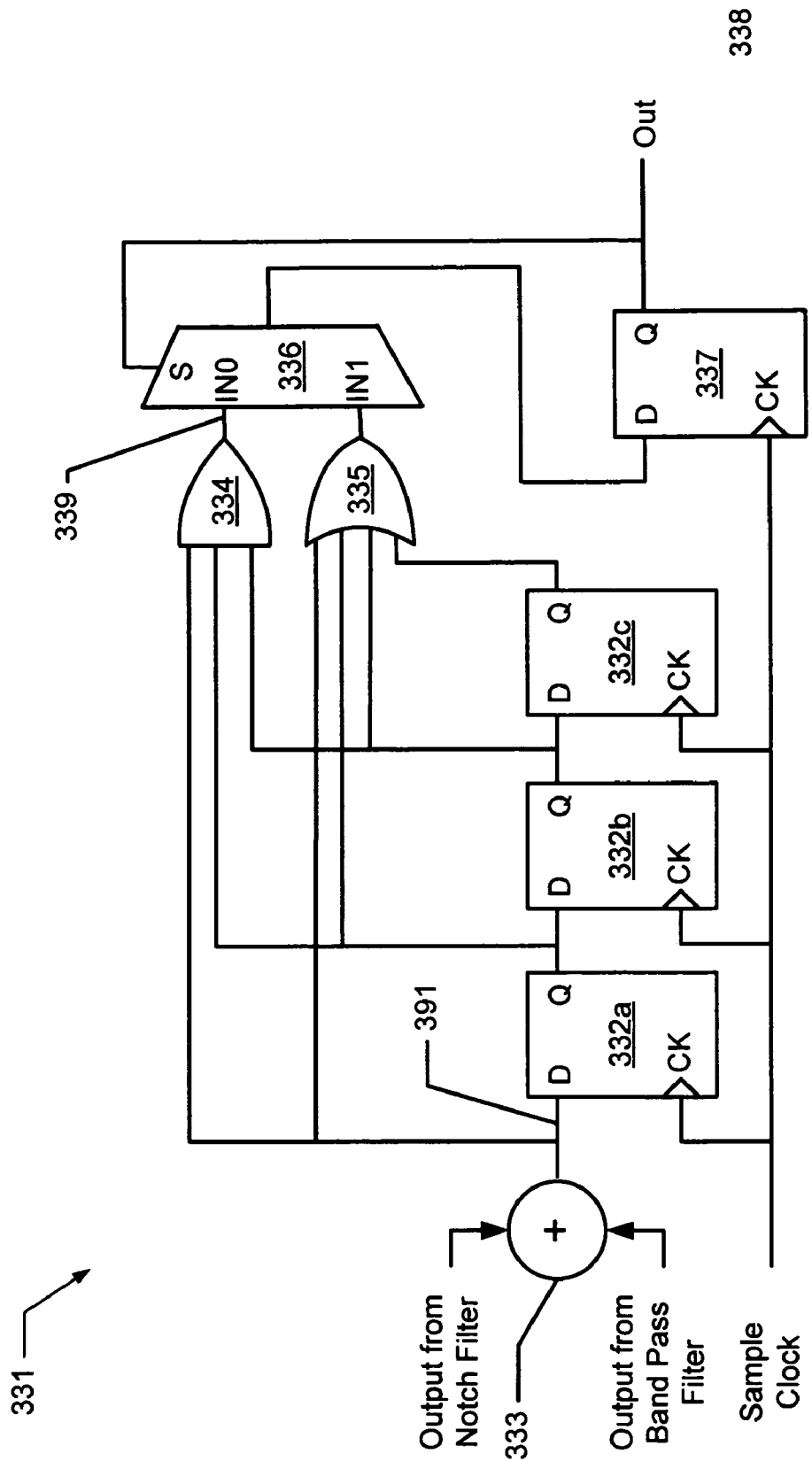

Turning to FIG. 4d, an exemplary spiral entry detect circuit 331 that may be used in place of spiral entry detect circuit 330 is depicted in accordance with one or more embodiments of the present invention. The output of bandpass filter circuit 320 and the output of notch filter circuit 310 are provided as inputs to a comparator 333. The output of comparator 333 indicates whether detected signal 380 is being received from spiral reference pattern 210, and is provided to a series of three flip-flops 332, an AND gate 334 and an OR gate 335 that are used in combination to provide the time averaging and magnitude qualification discussed above in relation to spiral entry locator circuit 330. Of particular note, AND gate 334 operates as a magnitude qualifier by requiring three consecutive high assertions of output 391 before samples are captured by spiral entry locator circuit 331. Another flip-flop 337 and a multiplexer 336 is provided to maintain the detection of region 229 once magnitude qualification is completed.

In particular, an output 338 of spiral entry detect 331 is initially asserted low causing the output from AND gate 334 to drive the input of flip-flop 337 via multiplexer 336. When the head assembly begins to traverse spiral reference pattern 210, an output 391 of comparator 333 is asserted high indicating a tentative decision that region 229 has been detected. Where output 391 remains high for three consecutive periods of the sample clock, all inputs to AND gate 334 are asserted high causing an output 339 of AND gate 339 to assert high. This, in turn causes output 338 to be asserted high on the subsequent sample clock and selection of the output of OR gate 335 to drive the input of flip-flop 337. Upon a high assertion of output 338, spiral entry locator 331 captures the subsequent N samples for comparison with samples captured by spiral exit locator 350 as discussed above. The output of OR gate 335 remains asserted high until output 391 is asserted low for four consecutive periods indicating that the head has finished traversing spiral reference pattern 210. At this point, output 339 is asserted low and drives the input of flip-flop 337.

Figure 4E:
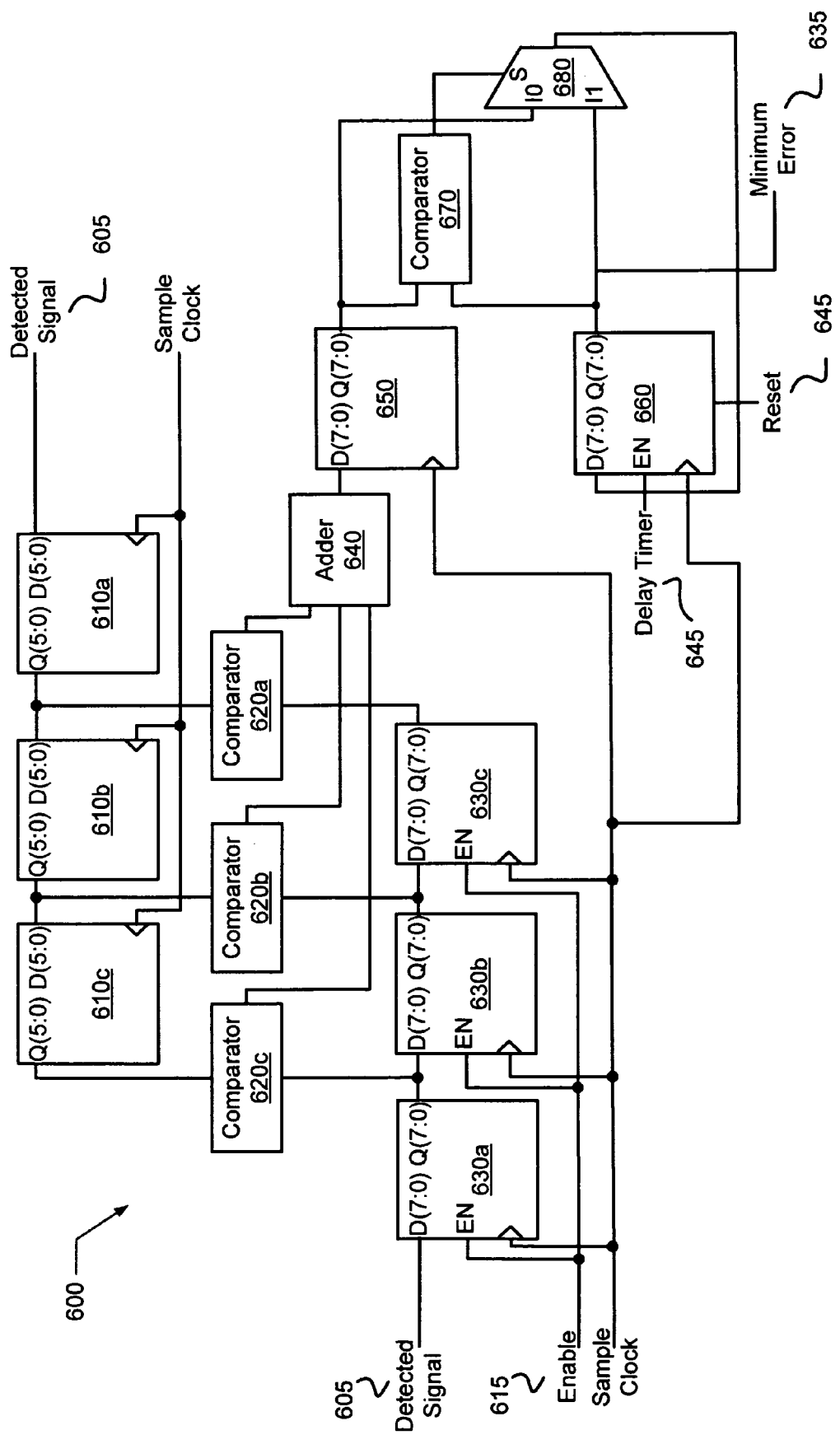

Turning to FIG. 4e, a circuit 600 that may be used for implementing portions of spiral entry locator 330, spiral exit locator 350 and comparator 360 is depicted in accordance with one or more embodiments of the present invention. Circuit 600 includes a series of three registers 630 connected in series that are tailored for receiving and maintaining the reference samples from region 229. It should be noted that where more than three reference samples are to be collected, additional registers 630 would be included; or where fewer than three reference samples are to be collected, fewer registers 630 would be included. When enabled by an enable signal 615, registers 630 operate to receive and maintain three consecutive samples of a detected signal 605 that is the filtered version of detected signal 380. Enable signal 615 is initially asserted when output 338 is asserted, and disabled after three consecutive sample clocks.

Another series of registers 610 are connected in series and receive the same detected signal 605. Registers 610 are continuously updated and the outputs of registers 610 are compared in reverse order to the outputs of registers 630 using comparators 620. In particular, the output of register 610c is compared with the output of register 630a using comparator 620c; the output of register 610b is compared with the output of register 630b using comparator 620b; and the output of register 610a is compared with the output of register 630c using comparator 620a. Again, where a different number of samples are to be used in determining the peak location, more or fewer of registers 610 and comparators 620 may be used. The respective outputs of comparators 620 are provided to an adder 640 that aggregates the received comparator outputs to create an error value. The error value is stored in a register 650.

The stored error value in register 650 is compared with a previously stored error value maintained in a register 660 using a comparator 670. A reset signal 645 is asserted each time processing of an overall signal pattern 219 begins to assure that register 660 is at a maximum, and register 660 is only updated when a delay timer 625 is asserted (i.e., the delay timer discussed in blocks 423, 425 of FIG. 3 above). An output of comparator 670 controls the select input of a multiplexer 680. In particular, whenever the value in register 650 is less than the value in register 660, the value from register 650 is fed to register 660 via multiplexer 680. Alternatively, whenever the value in register 650 is greater than the value in register 660, the value in register 660 is fed to register 660 via multiplexer 680. In this way, register 660 maintains the value of a minimum error 635 between the reference samples and samples taken later in the processing of overall signal pattern 219. Further, while not shown in circuit 600, anytime the value from register 650 is fed to register 660 via multiplexer 680, the time stamp associated with the value maintained in register 650 (i.e., the time stamp associated with the samples in registers 610 that were used to create the value stored in register 650) is updated as the time stamp of the minimum error output 635. This time stamp (i.e., T2 discussed in relation to FIG. 3 above) is provided to location calculator 370.

Figure 5:
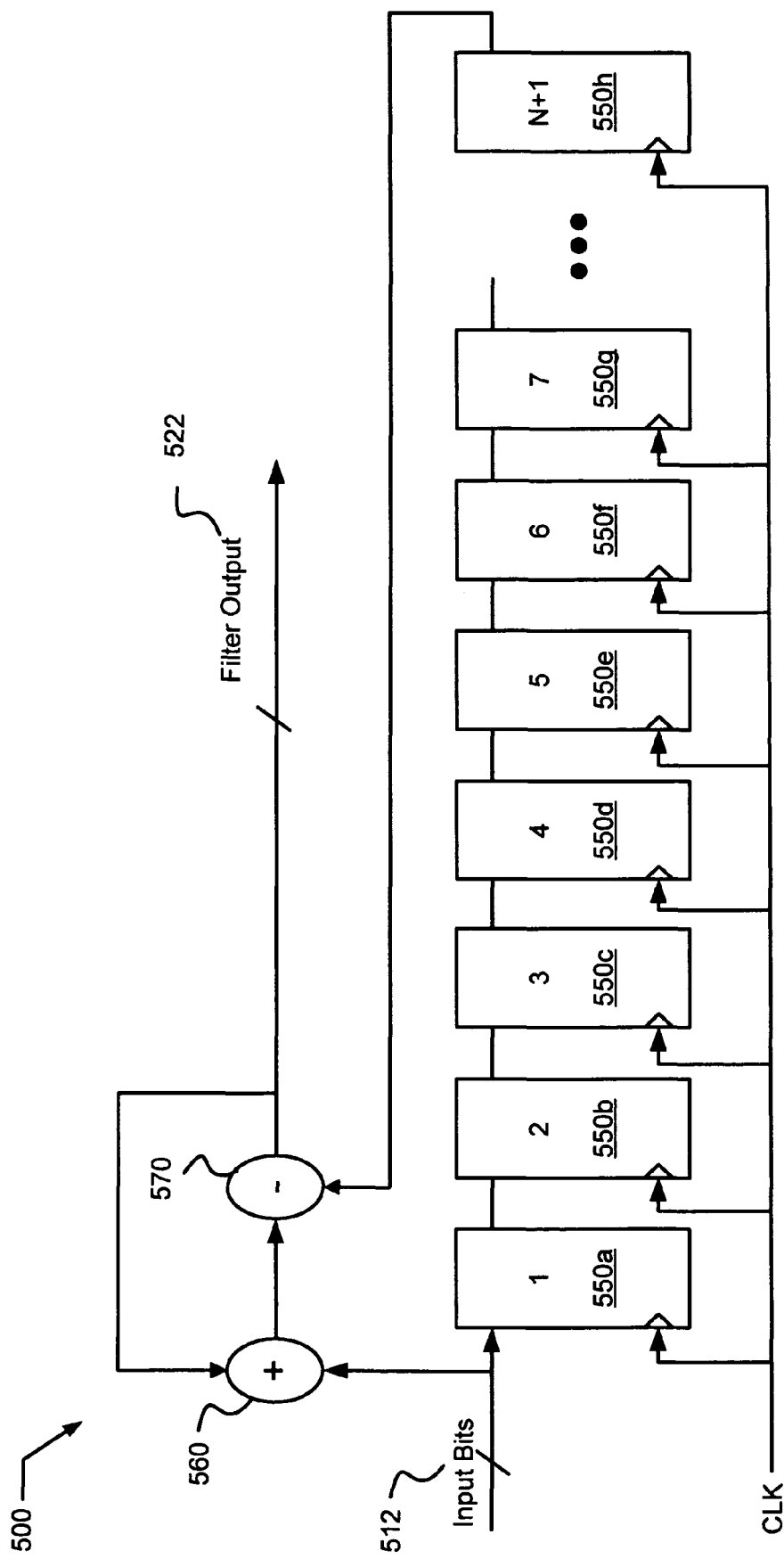
FIG. 5 depicts a low pass filter that may be used in relation to one or more embodiments of the present invention.

Turning to FIG. 5, a low pass filter 500 that may be employed in relation to one or more embodiments of the present invention is depicted. Low pass filter 500 may be used to low pass filter detected signal 380 prior to providing it to spiral entry locator circuit 330 and/or spiral exit locator circuit 350. Low pass filter 500 includes a series of (N+1) flip-flops 550. The input of the first flip-flop in the series (i.e., flip-flop 550a) is by an input signal stream 512. In turn, the output of flip-flop 550a feeds the input of the succeeding flip-flop in the series (i.e., flip-flop 550b). This continues with the output of each preceding flip-flop feeding the input of each succeeding flip-flop until flip-flop N (not shown) feeds the last flip-flop in the series (i.e., flip-flop 550h). The input signal stream 512 is added to an output 522 of low pass filter 500 by an adder 560, and the sum of adder 560 is subtracted from the output of flip-flop 550h to create output 522.

Other embodiments of the present invention may operate by identifying the region of increasing amplitude and taking two or more samples from within the region. These two or more samples may be used to form a slope for the region of increasing amplitude. In particular, the following equation defines a straight line passing through the two or more samples:

$$y_i = m_i x_i + b_i,$$

where b is the y intercept and m is the slope of the region of increasing amplitude. The slope is defined by the following equation:

$$m_i = (Y_2 - Y_1)/(X_2 - X_1),$$

where $(X_1, Y_1)$ and $(X_2, Y_2)$ are sample points within the region of increasing amplitude. Thus, the straight line traversing the sample points is:

$$y_i = [(Y_2 - Y_1)/(X_2 - X_1)] x_i + b_i.$$

The process is continued by sampling through the transitional region until the region of decreasing amplitude is identified. Once identified, two or more samples from within the region of decreasing amplitude are taken. These samples are used to form a slope for the region of decreasing amplitude using the following equations:

$$y_d = m_d x_d + b_d; \text{ and}$$

$$m_d = (Y_4 - Y_3)/(X_4 - X_3),$$

where $(X_3, Y_3)$ and $(X_4, Y_4)$ are sample points within the region of decreasing amplitude. The straight line traversing the sample points is thus:

$$y_d = [(Y_4 - Y_3)/(X_4 - X_3)] x_d + b_d.$$

From this point, both of the aforementioned equations can be used to solve for the intercept or peak time location. In particular, the solution yields:

$$\text{Peak Time Location} = \frac{(b_d - b_i)}{[(Y_4 - Y_3)/(X_4 - X_3)] - [(Y_2 - Y_1)/(X_2 - X_1)]}.$$

Such calculations may be performed in a processor that may be included with one or more of the aforementioned embodiments.

Based on the disclosure provided herein, one of ordinary skill in the art will recognize a variety of advantages that are achievable using various embodiments of the present invention. For example, embodiments of the present invention may be used to aid a disk drive manufacturer in writing their own servo patterns using a read channel coupled to circuitry in accordance with one or more embodiments of the present invention. In some cases, embodiments of the present invention are implemented in hardware and offer very quick operation. Other embodiments of the present invention may be implemented in software or firmware, or a combination of software/firmware and hardware for flexibility and/or cost effectiveness.

In conclusion, the present invention provides novel systems and methods for detecting peak signal location. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for peak signal detection, wherein the method comprises:
   receiving a signal, wherein the signal includes a first signal region increasing in amplitude and a second signal region decreasing in amplitude, and wherein the first signal region and second signal region are coupled by a transitional signal region;
   sampling the first signal region to yield a first plurality of samples corresponding to the first signal region;
   sampling the second signal region to yield a second plurality of samples corresponding to the second signal region;
   fixing a first time associated with one sample of the first plurality of samples;
   comparing the second plurality of samples with the one of the first plurality of samples;
   identifying one of the second plurality of samples that is closest to the one of the first samples;
   fixing a second time associated with the one of the second plurality of samples; and
   calculating a midpoint between the first time and the second time, wherein the mid-point corresponds to the peak of the signal.

2. The method of claim 1, wherein identifying the second time includes:
   storing the second plurality of sequential samples;
   subtracting the first plurality of sequential samples from the second plurality of sequential samples on a sample by sample basis to yield a number of differences; and
   summing the absolute value of each of the differences to yield an absolute difference.

3. The method of claim 2, wherein identifying the second time further includes:
   repeating the storing the second plurality of sequential samples, and the subtracting the first plurality of sequential samples from the second plurality of sequential samples on a sample by sample basis and in reverse order at least until a minimum absolute difference is identified.

4. The method of claim 1, wherein the method further comprises:
   providing a storage medium, wherein the storage medium includes a spiral reference pattern;
   providing a head assembly disposed in relation to the storage medium; and
   wherein receiving the signal includes traversing the storage medium by the head assembly along a traversal path, wherein the traversal path crosses the spiral reference pattern at an angle greater than zero, wherein the first signal region occurs in relation to an increasing cross-over with the spiral reference pattern, wherein the second signal region occurs in relation to a decreasing cross-over with spiral reference pattern, and wherein the transitional signal region occurs in relation to a substantially constant cross-over with the spiral reference pattern.

5. The method of claim 1, wherein the method further includes:
   applying digital interpolation, wherein the digital interpolation is operable to produce the first plurality of sequential samples and the second plurality of sequential samples in phase with the peaks of information maintained in the spiral reference pattern.

6. The method of claim 1, wherein the angle at which the traversal path crosses the spiral reference pattern is programmable.

7. A method for identifying signal peaks of a spiral reference pattern, the method comprising:
   providing a storage medium, wherein the storage medium includes the spiral reference pattern;
   traversing the storage medium along a traversal path, wherein the traversal path crosses the spiral reference pattern at an angle greater than zero, wherein the traversal results in receiving a signal, and wherein the signal includes a first signal region, a second signal region, and a transitional signal region;
   sampling the first signal region to form a first sample;
   identifying a first location within the first signal region;
   fixing a first time associated with the first sample;
   identifying a second location within the second signal region, wherein a difference between the first sample and a second sample associated with the second location is a minimum;
   fixing a second time associated with the second sample;
   based at least in part on the first time and the second time, calculating a distance between the first location and the second location;
   determining a peak of the signal, wherein the peak of the signal is approximately equal distance from the first signal region and the second signal region; and
   wherein the first signal region occurs in relation to an increasing cross-over with the spiral reference pattern, wherein the second signal region occurs in relation to a decreasing cross-over with spiral reference pattern, wherein the transitional signal region occurs in relation to a substantially constant cross-over with the spiral reference pattern, and wherein the first signal region is substantially symmetric with the second signal region.

8. The method of claim 7, wherein the method further comprises:
   providing a storage medium, wherein the storage medium includes a spiral reference pattern;
   providing a head assembly disposed in relation to the storage medium; and
   wherein receiving the signal includes traversing the storage medium by the head assembly along a traversal path, wherein the traversal path crosses the spiral reference pattern at an angle greater than zero, wherein the first signal region occurs in relation to an increasing cross-over with the spiral reference pattern, wherein the second signal region occurs in relation to a decreasing cross-over with spiral reference pattern, and wherein the transitional signal region occurs in relation to a substantially constant cross-over with the spiral reference pattern.

9. The method of claim 7, wherein the method further includes:
applying digital interpolation, wherein the digital interpolation is operable to produce the first plurality of sequential samples and the second plurality of sequential samples in phase with the peaks of information maintained in the spiral reference pattern.

10. The method of claim 7, wherein the angle at which the traversal path crosses the spiral reference pattern is programmable.

* * * * *